Figures 1, 2:
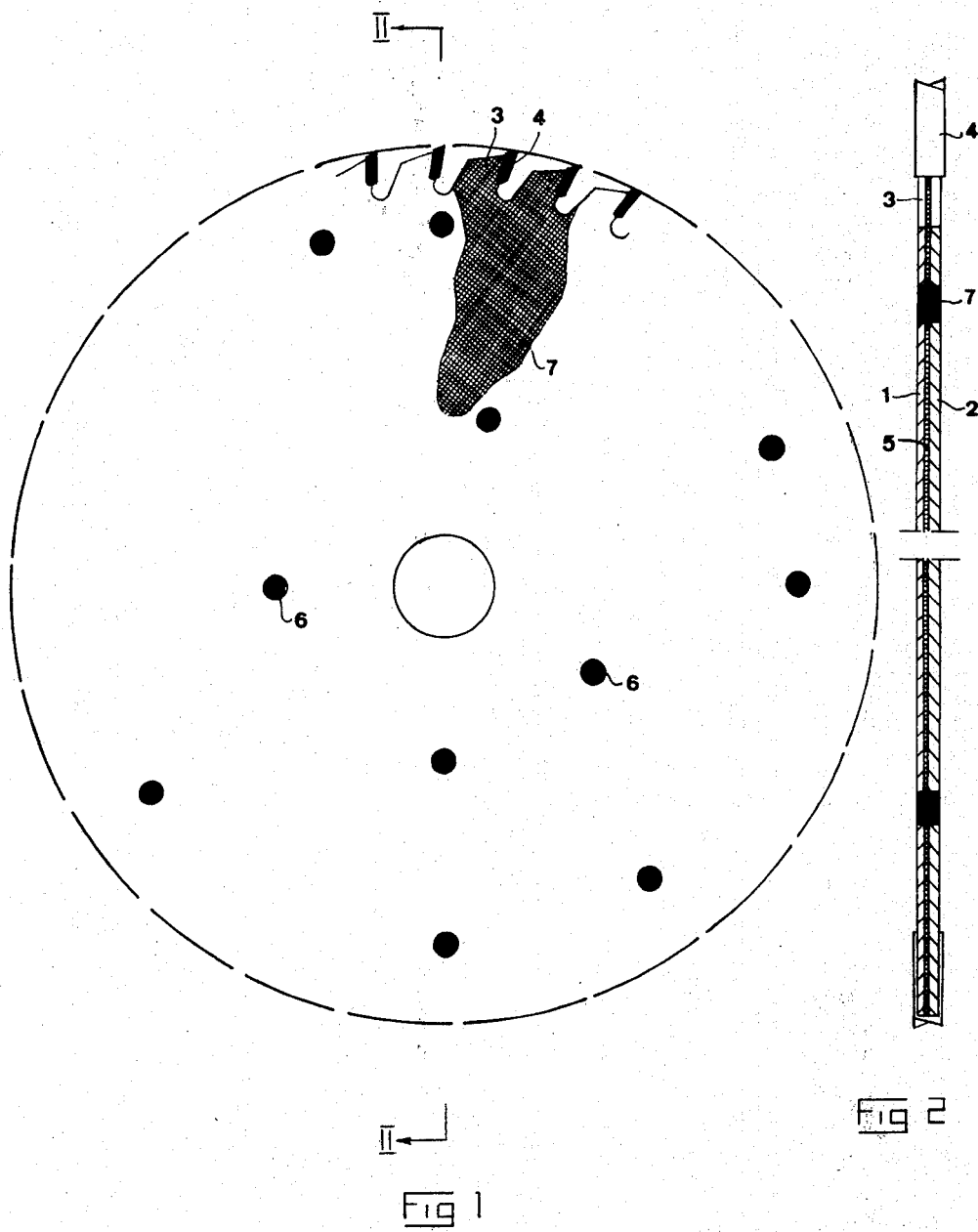

United States Patent [19]
Wikner et al.

[11] 3,990,338
[45] Nov. 9, 1976

[54] LAMINATED SAW BLADE

[75] Inventors: Gunnar Wikner, Kalmar; Percy Josefsson, Farjestaden, both of Sweden

[73] Assignee: Gomex Verktyg AB, Kalmar, Sweden

[22] Filed: Dec. 26, 1973

[21] Appl. No.: 428,197

[30] Foreign Application Priority Data
Jan. 17, 1973 Sweden .............................. 7300619

[52] U.S. Cl. .............................. 83/835; 76/101 R; 76/112; 51/207; 125/15
[51] Int. Cl.² .................... B27B 33/08; B23D 45/00
[58] Field of Search ................ 83/835, 676; 76/112, 76/101 R; 51/206 R, 206 NF, 207, 404–407; 125/13 SS, 15

[56] References Cited
UNITED STATES PATENTS

| | | | |
|---|---|---|---|
| 2,694,852 | 11/1954 | Rogers | 76/101 R |
| 2,794,458 | 6/1957 | Dosker | 76/112 UX |
| 3,485,276 | 12/1969 | Font | 83/821 |
| 3,799,025 | 7/1971 | Tsunoda | 83/676 X |
| 3,812,755 | 5/1974 | Danielsen | 83/835 |

Primary Examiner—Willie G. Abercrombie
Attorney, Agent, or Firm—Browdy and Neimark

[57] ABSTRACT

The present invention relates to a method in the production of rotatable tools, such as saw blades or similar, comprising at least two preferably metallic discs interconnected by means of glue, solder or any other binding means or adhesive wherein spacing members of a uniform overall thickness are disposed between the discs to position the discs parallel to each other and to ensure a uniform layer thickness of the binding means. Said invention also relates to a means to perform the method and to the product achieved by the method.

22 Claims, 5 Drawing Figures

LAMINATED SAW BLADE

Rotatable working tools as saw blades, e.g. diamond saw blades or similar, may, to the end of eliminating or reducing noise during operation of the tool, be manufactured by uniting two or a plurality of preferably metallic, disc like portions by means of a binding or joining agent while forming a plate or disc shaped tool. As binding agents, glues of different kinds are usually used, preferably of the epoxy type, but also other agents are conceivable. Regardless of the fact whether a glue or another binding or joing agent be utilized, it has proven to be extremely difficult to unite the disc portions in a manner to make them parallel to each other. A deviation, however slight, from a parallel condition between the portions implies in practice that noise generating oscillations will be furthered in the tool, something that is extremely serious in connection with saw blades. The causes why an exact parallel condition between the disc portion is difficult to obtain are primarily the difficulties in coating the glue or binding agent evenly between the discs. The glue will frequently form lumps at certain locations, it may be absorbed into different zones etc. The difficulties are particularly conspicuous when tools of a large diameter are involved.

The present invention is related to a method for eliminating the above disadvantages and providing products with an ideal form, e.g. saw blades in which the interconnected disc portions are parallel to each other.

What primarily characterizes the method according to the invention is that spacing members of a uniform overall thickness are disposed between the discs to position the discs parallel to each other and to ensure uniformity of the layer thickness of the binding or joining agents.

As spacing members wire or fibre nets are preferably used, suitably nets wherein the wires or fibres are metallic.

Object of the invention is further a means for carrying out the method, as well as saw blades produced by the method.

With reference to the appended drawings, below follows a more specific description of a number of embodiments of the invention cited as examples.

Figures 3, 4:
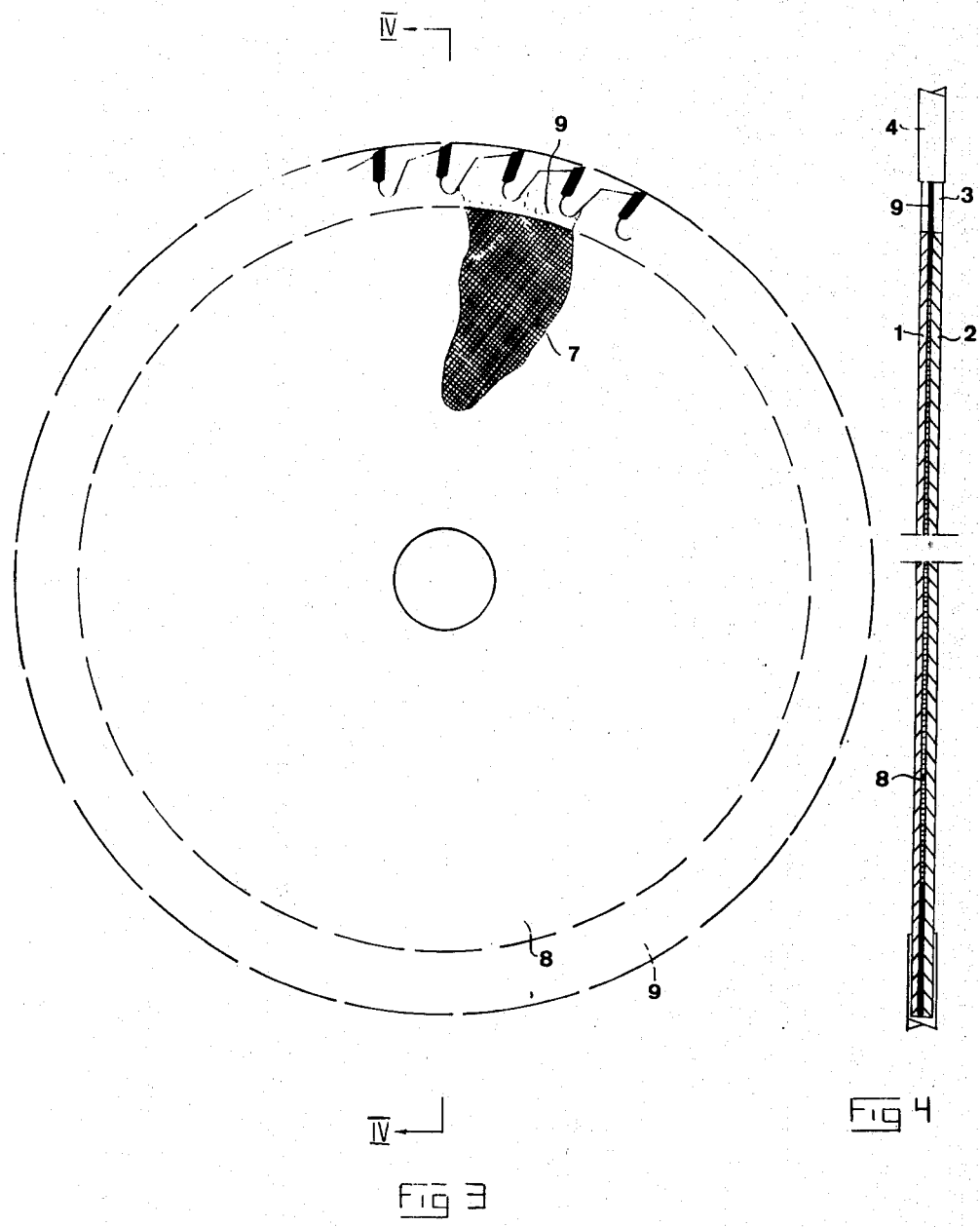

In the drawings:

FIG. 1 is a simplified and partially cross sectional plan view of a first embodiment of a saw blade according to the invention;

FIG. 2 an enlarged and partially cross sectional view II — II in FIG. 1;

FIG. 3 a plane view similar to that in FIG. 1 but showing a second alternative embodiment of the invention;

FIG. 4 an enlarged and partially cross sectional view IV — IV in FIG. 3, and

Figure 5:
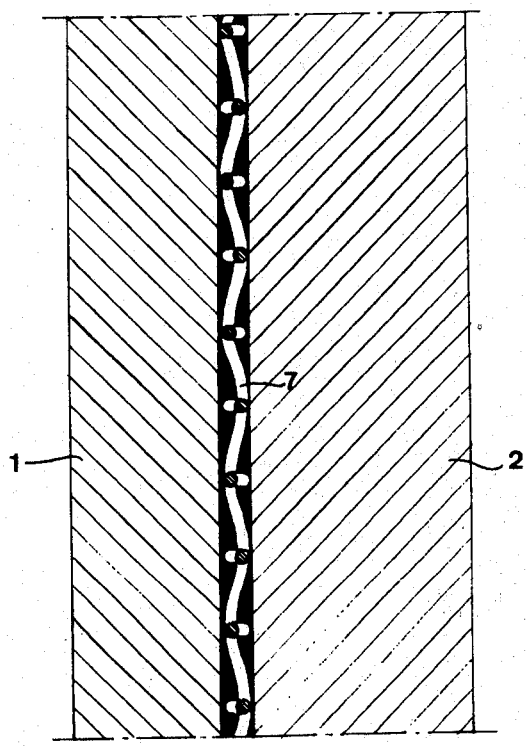

FIG. 5 an extremely enlarged portion of a cross sectional view of the saw blade.

In the drawings, 1 and 2 designates two substantially circular discs which are joined to each other while forming a body of a saw blade. The discs may have a different thickness, see FIG. 2. At the periphery of the discs, shoulders 3 for the cutting edges 4 of the blade are formed. The numeral 5 generally designates a binding layer between the disc portions 1 and 2 which layer in the embodiment according to FIGS. 1 and 2 together with a number of spot welds 6 joins the discs intimately to each other. Also the cutting edges 4 cooperate to interconnect the discs.

In accordance with the principle of the invention there is disposed between the discs 1 and 2, together with the binding agent forming the binding layer 5 proper, spacing members for parallel positioning of the discs and ensuring a uniform thickness of the binding agent. As a spacing member, a wire or fibre net 7 is used in this case, the wires or fibres of which may advantageously consist of a metal, e.g. copper, iron or similar, or alloys of different kinds.

The net 7 may with advantage have substantially rhombus shaped, square or rectangular meshes. An idea of the dimensions of the net or net wires is obtained by FIG. 5 where a partial section through a body blade is shown. The discs 1 and 2 may have thicknesses varying between 0.5 and 3 mm, and perhaps different thicknesses. In dependence of disc thickness, body diameter, kind of binding agent and the desired joint layer thickness, the net 7 may have wires or fibres having a thickness of 0.01 – 0.4 mm, preferably 0.15 – 0.25 mm or suitably 0.2 mm. The mesh width may be 2 – 100, preferably 3 – 50 or suitably 5 – 10 times greater than the wire and fibre thickness respectively. It appears by FIG. 5 that the wires of the net 7 are intertwined so that every second wire in a given direction is disposed at different sides of a single transversely extending wire. Then the wires will serve as spacing members at the individual abutting points where the wires are in a direct contact with the discs 1 or 2. If a great amount of binding agent is used, they are imbedded in the binding agent.

The binding agent may be a glue or another adhesive. In this connection glues occurring in commerce are of interest, for instance hardening glues of epoxy type or other plastic glues, though also rubber based glues may be used. Glues of the kind described in the Swedish patent specification No. 352,270 are particularly suitable, containing dispersed metallic particles to make the glue electrically conductive. The glue may for instance comprise 90 parts by volume of an epoxy glue with a hardener and 10 parts by volume of an aluminium powder A100. Such electrically conductive glues are particularly advantageous in connection with the embodiment shown in FIGS. 1 and 2, which includes spot welds 6 which together with the glue interconnect the discs 1 and 2 intimately.

When the binding agent is a glue, the net 7 may be dipped therein, coated or sprayed therewith and disposed between the discs which are pressed together, whereupon the glue is permitted to set or harden. Thanks to the net 7, the glue will spread quite evenly between the discs which will, thanks to the net, become exactly parallel to each other.

According to a second embodiment of the invention a solder may be used in place of a glue or other adhesives. In the production of the saw blades according to the invention by means of a solder as a joining agent the net 7 is coated with the solder and disposed between the discs 1 and 2, whereupon the discs are moved or pressed together and heated to cause the solder to melt and fix the discs together. The coating of the net with solder is made in advance and may be carried out either by dipping the net into molten solder or by depositing electrolytically the solder onto the net whereby an extremely even distribution of solder on the net will be obtained.

In the embodiment in FIGS. 1 and 2 the net 7 is together with the binding agent, i.e. the binding layer 5, caused to cover substantially all the contact surface between the discs 1 and 2 so as to interconnect intimately not only the central portions of the discs but also the tooth points or shoulders 3 for the cutting edges 4 by means of the binding layer 5.

According to FIGS. 3 and 4, the net 7 together with the binding or joining agent is caused to cover a central portion 8 of the contact surface while leaving free a peripheral annular portion 9, the discs being along this portion 9 interconnected by means of soldering. The portion 1 should, regardless of the height of the tooth points or the shoulders 3, have a width of at least 1 – 20 mm. By soldering in this manner the outer peripheral portion of the body blade, it is ensured that the gap between the two discs 1 and 2 will be completely sealed so as to prevent particles from migrating in between them.

A further possibility is to cause the net to cover all the contact surface between the discs as shown in FIGS. 1 and 2, however applying solder onto the outer peripheral area of 1 – 20 mm of the net while the remaining central portion of the net has a glue or binding agent. In this case the peripheral, 1 – 20 mm wide portion of the net may be silver plated in advance, and in connection with the assembling of the discs solder and fluxing material is supplied, preferably in powder form. The meshes serve then the purpose of retaining the powder in place during subsequent operations until its fusion with the tooth points will occur.

As a solder for the soldering of the outer peripheral portion 9 as well as a joining agent together with the net 7 it has proved extremely advantageous to use silver solder. Particularly convenient is a silver solder containing 35 – 55%, preferably 42% Ag and variable amounts of Cu, Zn, Cd and fluxing material, the silver solder having a fusion temperature of about 600°– 625° C and a suitable soldering temperature of 630° – 640° C.

The production of the saw blade shown in FIGS. 1 and 2 may in practice be carried out with the following steps:

a. warm pressing under a high pressure the two disc portions 1 and 2 at about 400° – 440° C, preferably 420° C,
b. straightening the discs,
c. surface grinding the two discs,
   degreasing the discs,
e. glueing the discs, preferably by means of a glue containing a dispersed electrically conductive powder, acetone and a hardener, the glue being applied between the discs together with a net or other suitable spacing members and the discs being disposed relative to each other to set off the fibre orientation from rolling 1° – 90°, preferably 45°,
f. spot welding the discs to each other by spot welds which are irregularly and unsymmetrically disposed.

For the production of the saw blade according to FIGS. 3 and 4 a method may be applied including the following additional steps beyond those previously mentioned:

a. application of the glue possibly including an electrically conductive powder together with the net over the central portion 8 of at least one disc, the peripheral annular portion 9 being left free of glue,
b. application of a layer of a solder onto the peripheral portion 9, the solder being preferably a silver solder having a fusion temperature of e.g. 600° C,
c. pressing of the two discs to each other until the glue hardens,
d. possibly a provision of spot welds further interconnecting the discs at predetermined locations, and surface grinding the discs in such manner that the individual discs will obtain different thickness,
e. securing the cutting edges 4 along the periphery of the discs, e.g. by soldering, the peripheral portion 9 being also heated to fuse the solder and interconnect the discs within said portion or area. The heating of the peripheral portion 9 together with solder provided thereon is most advantageously carried out by a high frequency current apparatus while rotating the discs or the saw blade, and
f. straightening of the ground saw blade.

The advantages of the invention are evident in that the net or reinforcing members 7 at all times ensure exact parallelism between the discs 1 and 2.

It will be understood that the invention is not limited to the embodiments described above and shown in the drawings. Thus, it is possible to use other kinds of spacing members in place of nets having meshes. Thus, it is conceivable to use as spacing members small spacing bodies which are in a suitable manner mixed into a glue or binding agent. In place of a net having meshes wires having no interconnection may come into question, e.g. parallel wires extending between clasping means disposed beyond the periphery of the disc, excessive portions of the wires being cut off after glueing together the discs. The net or the spacing members do not necessarily consist of a metal. It is for instance possible to use nets or spacing members consisting of plastic or similar, it being even conceivable to use a material disintegrating on heating. It will be understood that the essential matter is that the spacing members are in place between the discs during the step when the discs are being pressed together. When solder is used as a joining agent to form a binding layer together with the net, the solder may be applied to the net at the intersection points between the net wires only, the solder flowing out and forming a homogenous layer when heating is effected. The same applies in principle also when a glue or adhesive is used. The net may be saturated with binding agent or have binding agent around the individual wires only, the binding agent flowing out and forming a homogenous binding layer when the discs are pressed together. The discs do not necessarily consist of metal but may consist of non-metallic material as plastic, wood, glass, porcelain or mineralic materials. It is further conceivable to use, in place of one net as a spacing member, two or a plurality of nets, either joined to each other or overlapping, possibly of different kinds. Finally it is conceivable to have the spacing members or the net itself form the joining agent, for instance in that the spacing members or the net per se consists of a material fusing on heating and subsequently hardening while forming a binding layer between the discs. In this case the portions are welded together e.g. by means of spot welds. The spacing members or the net, in particular a fine mesh net, may form spot weld like webs between the portions. Also other modifications of the invention are conceivable within the scope of the patent claims.

We claim:

1. A high speed rotational saw blade substantially free of oscillations comprising at least two discs interconnected by a layer of binding means for joining said discs together, a meshed net having a uniform overall thickness disposed between each of said at least two discs for positioning each of said at least two discs relatively to each other in substantially exact parallel relationship and ensuring uniformity in the thickness of said layer of binding means, whereby the saw blade may be rotated at high speed substantially free of noise generating oscillations.

2. A saw blade according to claim 1, wherein said discs are constructed of metal.

3. A saw blade according to claim 1, wherein said meshed net is of a wire or fibrous construction.

4. A saw blade according to claim 3, wherein said meshed net is constructed of a metal wire.

5. A saw blade according to claim 3, wherein said wires or fibers of said net have a thickness of 0.01 – 0.4 mm.

6. A saw blade according to claim 3, wherein said wires or fibers of said net have a thickness of 0.15 – 0.25 mm.

7. A saw blade according to claim 3, wherein said wires or fibers of said net have a thickness of 0.2 mm.

8. A saw blade according to claim 3, wherein said net has meshes which are of a width being 2 – 100 times greater than the wire thickness.

9. A saw blade according to claim 3, wherein said net has meshes which are of a width being 3 – 50 times greater than the wire thickness.

10. A saw blade according to claim 3, wherein said net has meshes which are of a width being 5–10 times greater than the wire thickness.

11. A saw blade according to claim 3, wherein said net has substantially rhombic, square or otherwise resctangular meshes.

12. A saw blade according to claim 1, wherein said meshed net together with said binder means cover substantially all of the contact surfaces between said discs.

13. A saw blade according to claim 1, wherein said meshed net together with said binder means cover a central portion of the contact surface, while leaving aperipherical annular area free of said meshed net.

14. A saw blade according to claim 13, wherein the discs are soldered along said peripheral area by means of silver solder.

15. A saw blade according to claim 14, wherein said solder is a silver solder containing 35–55% Ag, and variable amounts of Cu, Zn, Cd, and fluxing material.

16. A saw blade according to claim 14, wherein said solder is a silver solder containing 42% Ag, and variable amounts of Cu, Zn, Cd, and fluxing material.

17. A saw blade according to claim 13, wherein said peripheral annular area has a width of at least 1 – 20 mm.

18. A saw blade according to claim 1, wherein said binding means includes said meshed net.

19. A saw blade according to claim 13, wherein said discs are interconnected along said peripheral area by soldering.

20. A saw blade according to claim 15, wherein said silver solder before joining has a fusion temperature of about 600° – 625° C and a soldering temperature of about 630° – 640° C.

21. A saw blade according to claim 1 wherein said binding means is a glue into which an electrically conductive material is dispersed and wherein said discs are welded together by spot welds.

22. A saw blade according to claim 1, wherein said discs are welded together by spot welds.

* * * * *